(12) United States Patent
Pang

(10) Patent No.: US 11,140,624 B2
(45) Date of Patent: Oct. 5, 2021

(54) METHOD AND DEVICE FOR WIRELESS CONTROL

(71) Applicant: BEIJING XIAOMI MOBILE SOFTWARE CO., LTD., Beijing (CN)

(72) Inventor: Fangcheng Pang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 60 days.

(21) Appl. No.: 16/693,227

(22) Filed: Nov. 23, 2019

(65) Prior Publication Data
US 2020/0383050 A1 Dec. 3, 2020

(30) Foreign Application Priority Data

May 30, 2019 (CN) .......................... 201910463535.5

(51) Int. Cl.
| | | |
|---|---|---|
| H04W 4/00 | (2018.01) | |
| H04W 52/02 | (2009.01) | |
| H04W 4/80 | (2018.01) | |
| H04W 8/00 | (2009.01) | |
| H04W 8/22 | (2009.01) | |
| H04W 84/12 | (2009.01) | |
| H04W 88/08 | (2009.01) | |

(52) U.S. Cl.
CPC ......... *H04W 52/0206* (2013.01); *H04W 4/80* (2018.02); *H04W 8/005* (2013.01); *H04W 8/22* (2013.01); *H04W 84/12* (2013.01); *H04W 88/08* (2013.01)

(58) Field of Classification Search
CPC ... H04W 52/0206; H04W 4/80; H04W 84/12; H04W 8/22; H04W 8/005

USPC .......................... 370/338, 329, 311, 208, 334
See application file for complete search history.

(56) References Cited

U.S. PATENT DOCUMENTS

| | | | | |
|---|---|---|---|---|
| 8,180,349 B1* | 5/2012 | Mohan | .............. | H04W 36/0022 455/437 |
| 8,467,326 B2* | 6/2013 | Deprun | ............. | H04W 52/0229 370/311 |
| 8,972,573 B2* | 3/2015 | Piemonte | .......... | H04M 1/72454 709/224 |
| 9,510,142 B2* | 11/2016 | Hans | .................... | H04L 51/043 |
| 9,876,591 B2* | 1/2018 | Kim | ..................... | H04B 17/318 |

(Continued)

FOREIGN PATENT DOCUMENTS

| | | |
|---|---|---|
| EP | 1895713 A1 | 3/2008 |
| EP | 2273828 A1 | 1/2011 |
| WO | 2014018215 A1 | 1/2014 |

OTHER PUBLICATIONS

European Search Report in the European application No. 19212250.5, dated May 15, 2020.

*Primary Examiner* — Marceau Milord
(74) *Attorney, Agent, or Firm* — Syncoda LLC; Feng Ma

(57) ABSTRACT

A method for wireless control includes: detection is performed through a Bluetooth (BT) portion of an Access Point (AP) to determine whether a terminal is detected or not; and responsive to that the terminal is detected and that a Wireless Local Area Network (WLAN) portion of the AP is off, the WLAN portion of the AP is turned on. With this method, the WLAN portion of the AP can be dynamically and automatically turned on, and a user is not required to check and turn on the WLAN portion of the AP personally, so that the utilization efficiency is improved.

17 Claims, 11 Drawing Sheets

(56) References Cited

U.S. PATENT DOCUMENTS

| | | | |
|---|---|---|---|
| 9,913,216 B1* | 3/2018 | Deshpande | H04W 28/14 |
| 2006/0116127 A1* | 6/2006 | Wilhoite | H04W 36/14 |
| | | | 455/442 |
| 2008/0058031 A1* | 3/2008 | Deprun | H04W 52/0229 |
| | | | 455/574 |
| 2008/0279138 A1* | 11/2008 | Gonikberg | H04W 88/06 |
| | | | 370/328 |
| 2008/0279162 A1* | 11/2008 | Desai | H04W 72/1215 |
| | | | 370/338 |
| 2009/0170519 A1* | 7/2009 | Wilhoite | H04M 3/42246 |
| | | | 455/436 |
| 2010/0029325 A1* | 2/2010 | Wang | H04W 72/1215 |
| | | | 455/553.1 |
| 2011/0196925 A1* | 8/2011 | Hans | G06Q 30/02 |
| | | | 709/204 |
| 2013/0176869 A1* | 7/2013 | Finlow-Bates | H04W 52/0254 |
| | | | 370/252 |
| 2013/0231138 A1* | 9/2013 | Hans | H04L 61/1594 |
| | | | 455/456.3 |
| 2014/0029494 A1 | 1/2014 | Sundaram | |
| 2014/0112231 A1 | 4/2014 | Qin | |
| 2016/0283699 A1* | 9/2016 | Levin | G06F 21/44 |
| 2017/0359849 A1* | 12/2017 | Zhang | H04W 72/14 |
| 2018/0070307 A1* | 3/2018 | Deshpande | H04W 28/22 |

\* cited by examiner

METHOD AND DEVICE FOR WIRELESS CONTROL

CROSS-REFERENCE TO RELATED APPLICATION

This application claims priority to Chinese patent application No. 201910463535.5 filed on May 30, 2019, the disclosure of which is hereby incorporated by reference in its entirety.

BACKGROUND

Since a first-generation Wireless Local Area Network (WLAN) standard, i.e., an 802.11 protocol, was released by the Institute of Electrical and Electronic Engineers (IEEE) in 1997, WLAN technologies have been developed for about 20 years. A user establishes connection with a Station (STA) through an Access Point (AP) in production and daily life to conduct various activities with the Internet.

SUMMARY

The present disclosure generally relates to the technical field of electronics, and more particularly, to a method and device for wireless control.

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

According to a first aspect of embodiments of the present disclosure, a method for wireless control is provided, which can be applied to an AP and include that:

detection is performed through a Bluetooth (BT) portion of the AP to determine whether a terminal is detected or not; and responsive to that the terminal is detected and that a WLAN portion of the AP is off, the WLAN portion of the AP is turned on.

According to a second aspect of the embodiments of the present disclosure, a method for wireless control is provided, which can be applied to an AP and include that:

whether there is a terminal connected with the AP is detected through a WLAN portion of the AP; and responsive to that there is no terminal in a WLAN communication connection with the AP and that a BT portion of the AP is off, the BT portion of the AP is turned on.

According to a third aspect of the embodiments of the present disclosure, a device for wireless control is provided, which can include:

a processor; and a memory configured to store an instruction executable by the processor, wherein the processor can be configured to execute the abovementioned methods.

According to a fourth aspect of the embodiments of the present disclosure, a non-transitory computer-readable storage medium is provided, having stored an instruction thereon, when executed by a processor, to enable the processor to execute the abovementioned methods.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments but not intended to limit the present disclosure. "A/an" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed. For example, A and/or B can represent three conditions, i.e., independent existence of A, coexistence of A and B and independent existence of B. Character "/" usually represents that previous and next associated objects form an "or" relationship.

It is to be understood that "first," "second" and similar terms used in the specification and claims of the present application are not to represent any sequence, number or importance but only to distinguish different parts. Terms like "include" or "comprise" refer to that an element or object appearing before "include" or "comprise" covers an element or object and equivalent thereof listed after "include" or "comprise" and does not exclude another element or object.

For example, the term "if" used here can be explained as "while" or "when" or "responsive to determining", which depends on the context.

A user typically needs to manually execute a switching operation on an AP and a STA, which brings to the user much inconvenience for establishing connection with a WLAN through an AP device and reduces the utilization efficiency. Various embodiments of the present disclosure can address these problems.

Figure 1:
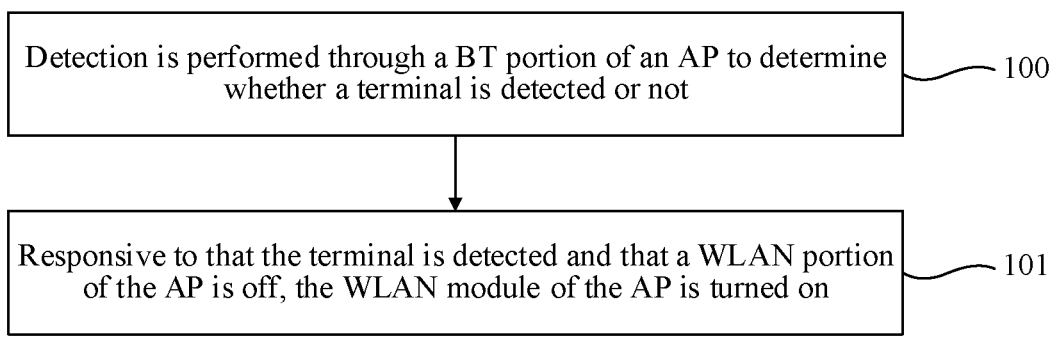
FIG. 1 is a flowchart illustrating a method for wireless control according to some embodiments.

FIG. 1 is a flowchart illustrating a method for wireless control according to some embodiments. The method can be applied to an AP. As shown in FIG. 1, the method can include the following operations.

In Operation 100, detection is performed through a Blue Teeth (BT) portion of the AP to determine whether a terminal is detected or not.

In Operation 101, responsive to that the terminal is detected and that a WLAN portion of the AP is off, the WLAN portion of the AP is turned on.

A WLAN can be represented as a communication network for implementing communication connection by use of a Radio Frequency (RF) technology through an electromagnetic wave.

The AP can be represented as a device for providing wireless signal access in the WLAN. The AP can be configured to execute a routing function and a wireless signal transmission function, or the AP can be configured to execute the wireless signal transmission function only. The type of the AP is not limited in the embodiments of the present disclosure.

The terminal can also be called a STA. The terminal can be represented as a wireless terminal device capable of establishing a wireless communication connection with the AP in the WLAN. The terminal can be configured with a wireless network card and can establish the wireless communication connection with the AP through the wireless network card. The wireless terminal device can be, for example, a mobile phone, a smart watch, a pad, a notebook computer and a desktop computer. The type of the terminal is not limited in the embodiments of the present disclosure.

As an example of the embodiments, the AP can detect whether the terminal exists or not through the BT portion of the AP (for example, the AP is in a query and scanning status, sends a query request signal through broadcast and, when receiving a query response signal returned by the terminal in response to the query request signal, can confirm that the terminal is detected). The AP, when the terminal is detected through the BT portion, can determine whether a WLAN mode of the AP is on or not and, when it is determined that the WLAN portion of the AP is in an off status, can turn on the WLAN portion of the AP.

During implementation, an intelligent control portion, the BT portion and the WLAN portion can be set in the AP. A terminal which establishes a connection with the AP through BT is detected through the BT portion, a terminal which establishes a connection with the AP through WLAN is detected through the WLAN portion, and turning-on and turning-off of the BT portion and turning-on and turning-off of the WLAN portion are intelligently controlled through the intelligent control portion according to the method in the embodiments of the present disclosure.

According to the embodiments of the present disclosure, detection is performed through the BT portion of the AP to determine whether the terminal is detected or not, and responsive to that the terminal is detected and that the WLAN portion of the AP is off, the turning-on the WLAN portion of the AP is carried out. The WLAN portion of the AP can be dynamically and automatically turned on, and a user is not required to check and turn on the WLAN portion of the AP personally, so that improvement in utilization efficiency is facilitated. Moreover, BT power is lower than WLAN power, and WLAN can be turned on when the terminal is detected through BT or WLAN can be turned off and BT is turned on when no terminal is in communication connection with WLAN, so that power consumption of the AP can be dynamically reduced, and energy conservation of the device is achieved.

Figure 2:
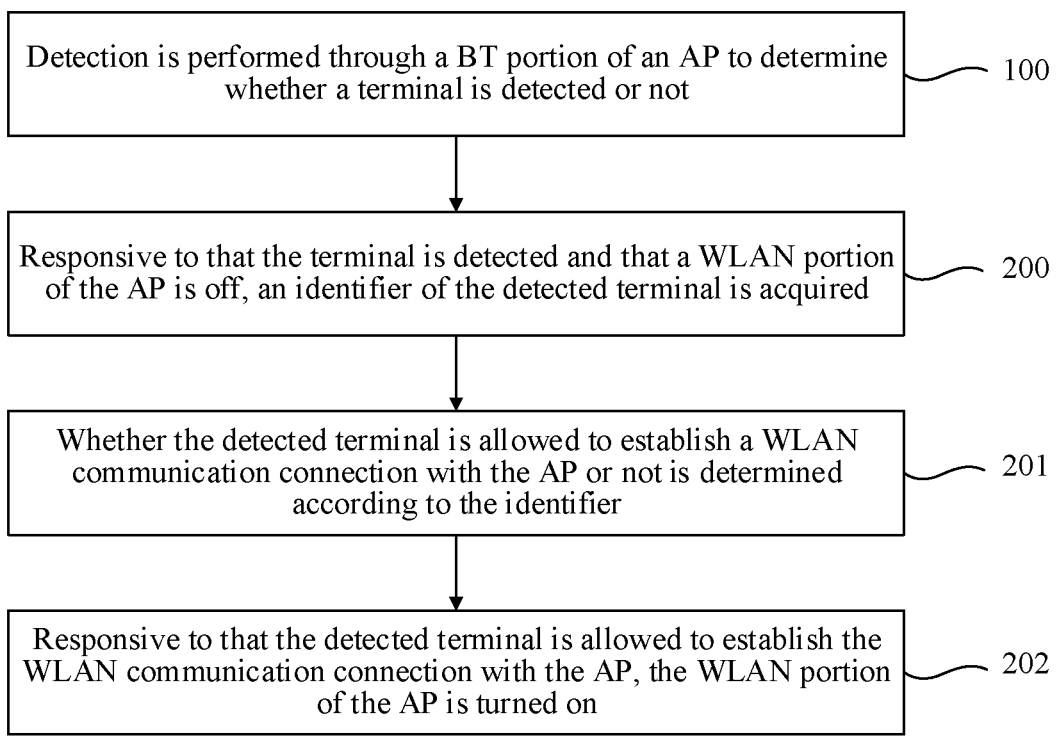
FIG. 2 is a flowchart illustrating a method for wireless control according to some embodiments.

FIG. 2 is a flowchart illustrating a method for wireless control according to some embodiments. As shown in FIG. 2, the difference between FIG. 2 and FIG. 1 is that the Operation 101 can include the following operations.

In Operation 200, responsive to that the terminal is detected and that the WLAN portion of the AP is off, an identifier of the terminal is acquired.

In Operation 201, whether the terminal is allowed to establish a WLAN communication connection with the AP or not is determined according to the detected identifier.

In Operation 202, responsive to that the terminal is allowed to establish the WLAN communication connection with the AP, the WLAN portion of the AP is turned on.

As an example of the embodiments, the AP, when the terminal is detected through the BT portion, can determine whether the WLAN portion of the AP is on or not and, when it is determined that the WLAN portion of the AP is off, can acquire the identifier of the terminal (the identifier of the terminal can be, for example, a BT device address of the terminal, and the BT device address of the terminal can be a 48-bit identifier allocated to the terminal by a manufacturer of the terminal). A table entry can be preset in the AP (the table entry can include, for example, a corresponding relationship among a terminal number, the BT device address of the terminal (for example, a 48-bit identifier allocated to a BT device by a manufacturer of the terminal) and a media access control address of a WLAN device of the terminal), and when it is determined that the identifier of the terminal exists in the preset table entry, it can be determined that the terminal is allowed to establish the WLAN communication connection with the AP. Then, the AP, when it is determined that the terminal is allowed to establish the WLAN communication connection with the AP, can turn on the WLAN portion of the AP. The AP, when it is determined that the terminal is not allowed to establish the WLAN communication connection with the AP, cannot execute any operation.

In such a manner, according to the embodiments of the present disclosure, the WLAN portion of the AP can be turned on when the terminal allowed to establish the WLAN communication connection with the AP is detected, so that the WLAN portion can be pertinently turned on to effectively reduce the power consumption of the AP and achieve energy conservation.

Figure 3:
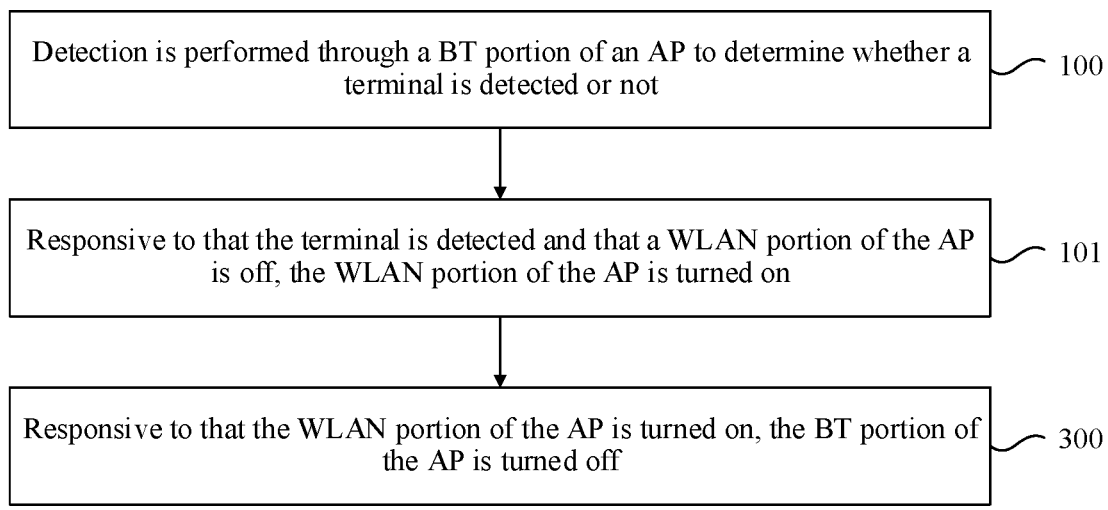
FIG. 3 is a flowchart illustrating a method for wireless control according to some embodiments.

FIG. 3 is a flowchart illustrating a method for wireless control according to some embodiments. As shown in FIG. 3, the difference between FIG. 3 and FIG. 1 is that the method can further include the following operation.

In Operation 300, responsive to that the WLAN portion of the AP is turned on, the BT portion of the AP is turned off For example, the AP, when the terminal is detected through the BT portion of the AP and when it is determined that the WLAN portion of the AP is off, can turn on the WLAN portion of the AP and turn off the BT portion. In such a manner, according to the embodiments of the present disclosure, turning-on and turning-off of the BT portion and WLAN portion of the AP can be dynamically and intelligently controlled, thereby dynamically reducing the power consumption of the AP and implementing energy conservation.

Figure 4:
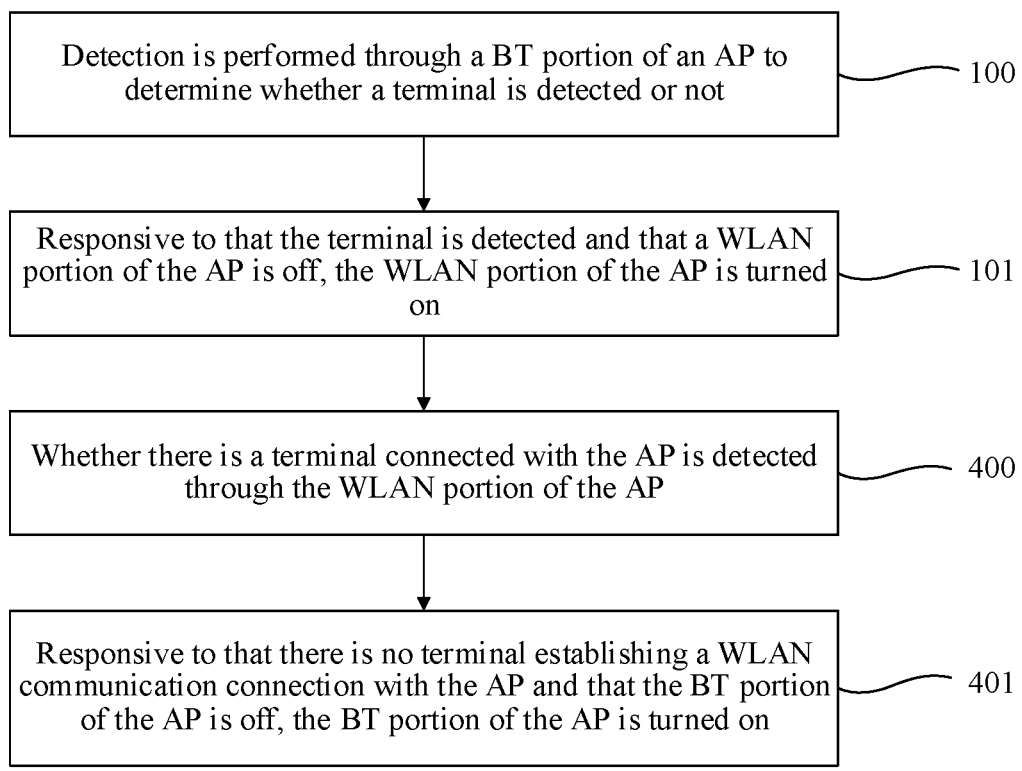
FIG. 4 is a flowchart illustrating a method for wireless control according to some embodiments.

FIG. 4 is a flowchart illustrating a method for wireless control according to some embodiments. As shown in FIG. 4, the difference between FIG. 4 and FIG. 1 is that the method can further include the following operations.

In Operation 400, whether there is a terminal connected with the AP is detected through the WLAN portion of the AP.

In Operation 401, responsive to that there is no terminal in a WLAN communication connection with the AP and that the BT portion of the AP is off, the BT portion of the AP is turned on.

For example, the AP, under the circumstance that the WLAN portion is turned on, can determine whether a terminal in the WLAN communication connection with the AP exists or not through the WLAN portion and, if the AP determines that the terminal in the WLAN communication connection with the AP does not exist, can turn off the WLAN portion of the AP and turn on the BT portion of the AP such that the WLAN portion of the AP can be turned on again when such a terminal is detected through the BT portion of the AP. In such a manner, according to the embodiments of the present disclosure, the WLAN portion is turned off when a WLAN function of the AP is not required to be used, so that the power consumption of the AP is further reduced, and dynamic energy conservation is achieved.

In a possible implementation mode, the method can further include that: when it is determined that the BT portion of the AP is turned off and the WLAN portion of the AP is turned off, turning-on the BT portion of the AP is carried out.

For example, the AP can dynamically detect whether the BT portion and WLAN portion of the AP are turned on or not and, when it is determined that both the BT portion and WLAN portion of the AP are turned off, can turn on the BT portion of the AP. In such a manner, turning-on and turning-off of the BT portion and WLAN portion of the AP can be dynamically and intelligently controlled.

In a possible implementation mode:

before the WLAN portion of the AP is turned on or turned off, the method can further include that when it is determined that the AP allows the WLAN portion of the AP to be controlled, turning-on or turning-off of the WLAN portion of the AP is carried out, or before the BT portion of the AP is turned on or turned off, the method can further include that when it is determined that the AP is allowed to control the BT portion of the AP, turning-on or turning-off of the BT portion of the AP is carried out.

For example, the user can selectively set whether the AP is allowed to intelligently control the WLAN portion or not according to a requirement. The AP can determine whether the AP is set to be allowed to intelligently control the WLAN portion or not before turning-on or turning-off of the WLAN portion is carried out, and the AP, when it is determined that the AP is set to be allowed to intelligently control the WLAN portion of the AP, can turn on or turn off the WLAN portion of the AP and, when it is determined that the AP is not allowed to intelligently control the WLAN portion of the AP, can not execute any operation. In such a manner, when the user does not require the AP to intelligently control turning-on and turning-off of the WLAN portion, the AP can be stopped to automatically control turning-on and turning-off of the WLAN portion, so that more operation choices are provided for a user.

Similarly, a user can selectively set whether the AP is allowed to intelligently control the BT portion or not according to a requirement. The AP can determine whether the AP is set to be allowed to intelligently control the BT portion or not before the BT portion is turned on or turned off, and the AP, when it is determined that the AP is set to be allowed to intelligently control the BT portion of the AP, can turn on or turn off the BT portion of the AP and, when it is determined that the AP is not allowed to intelligently control the BT portion of the AP, may not execute any operation. In such a manner, when the user does not require the AP to intelligently control turning-on and turning-off of the BT portion, the AP can be stopped to automatically control turning-on and turning-off of the BT portion, so that more operation choices are provided for the user.

Figure 5:
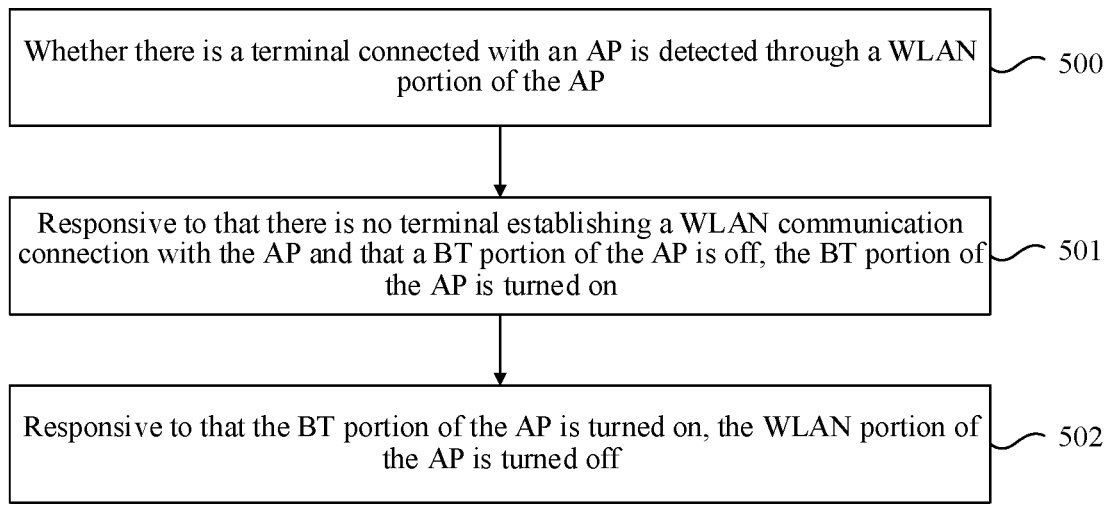
FIG. 5 is a flowchart illustrating a method for wireless control according to some embodiments.

FIG. 5 is a flowchart illustrating a method for wireless control according to some embodiments. The method can be applied to an AP. As shown in FIG. 5, the method can include the following operations.

In Operation 500, whether there is a terminal connected with the AP is detected through the WLAN portion of the AP.

In Operation 501, responsive to that there is no terminal in the WLAN communication connection with the AP and that the BT portion of the AP is off, the BT portion of the AP is turned on.

In Operation 502, responsive to that the BT portion of the AP is turned on, the WLAN portion of the AP is turned off.

Descriptions about Operation 500 to Operation 502 can refer to the above contents of the specification and elaborations are omitted herein.

An AP can be provided with an intelligent control portion for intelligently controlling a WLAN portion and a BT portion. A user can pre-configure the AP. Configuration items can include: a STA table entry, a setting about whether the intelligent control portion of the AP is allowed to control turning-on and turning-off of the WLAN portion or not, a setting about whether the intelligent control portion of the AP is allowed to control turning-on and turning-off of the BT portion or not and the like. The STA table entry can include a corresponding relationship among STA_ID, BD_ADDR and WLAN_MAC_ADDRESS, wherein STA_ID can represent a STA number; BD_ADDR can represent a BT device address of a STA, and BD_ADDR can be configured to uniquely identify a BT device; and WLAN_MAC_ADDRESS can represent a media access control address of a WLAN device of the STA, and WLAN_MAC_ADDRESS can be configured to uniquely identify the WLAN device in a WLAN.

Figure 6A:
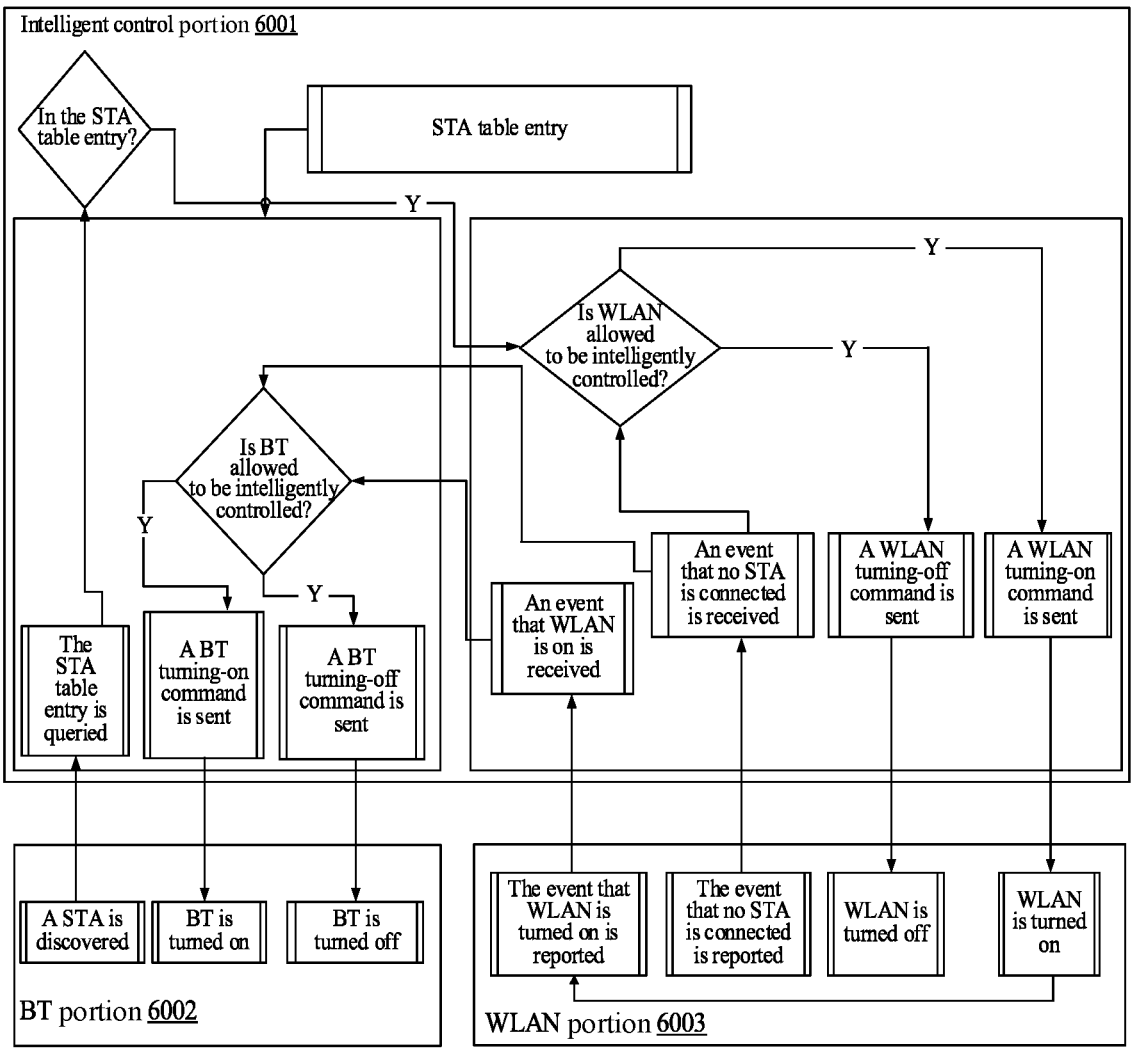
FIG. 6A is a flowchart illustrating a method for wireless control according to an application example.
Figure 6B:
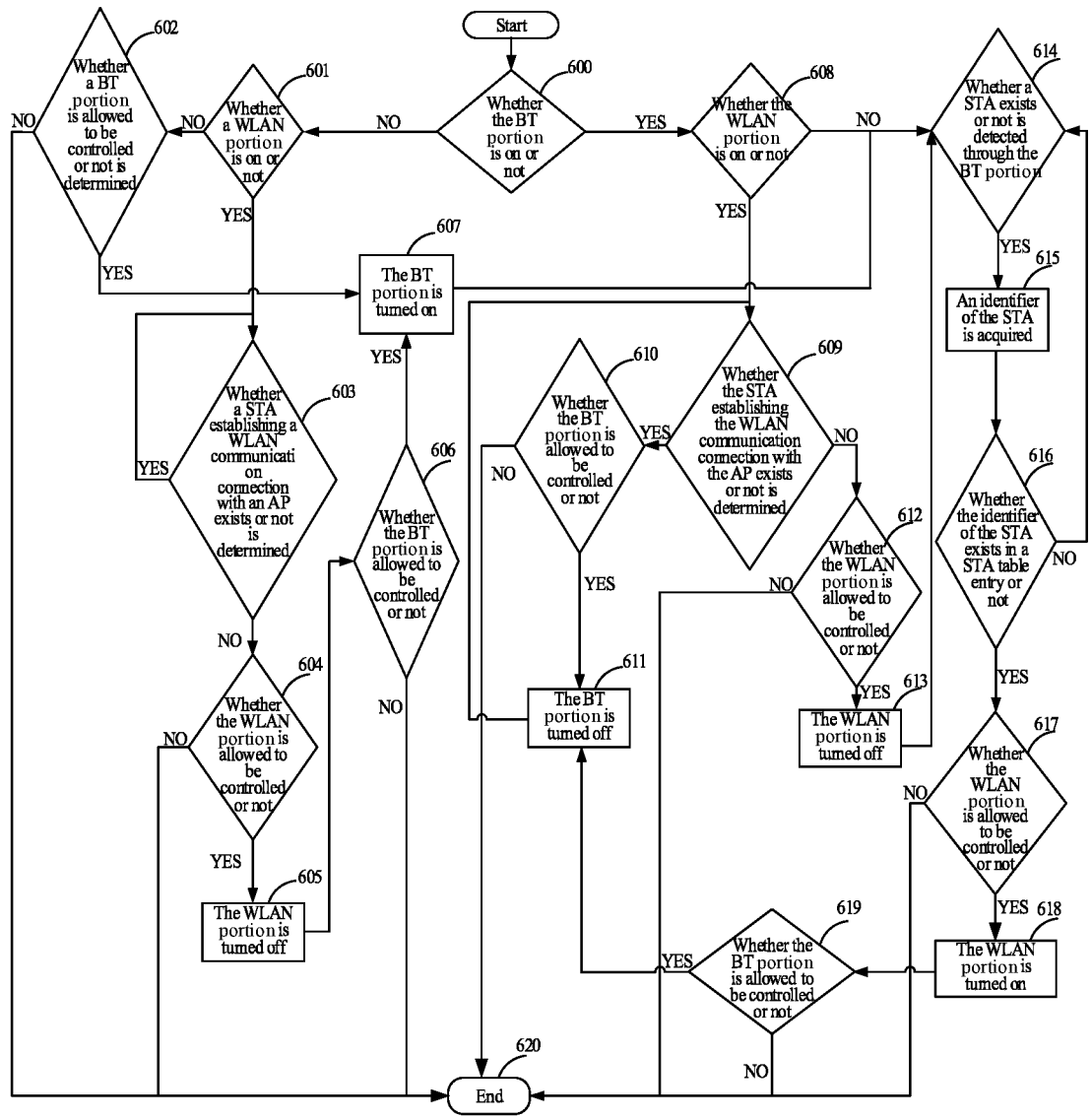
FIG. 6B is a flowchart illustrating a method for wireless control according to an application example.

FIG. 6A and FIG. 6B are flowcharts illustrating a method for wireless control according to an application example.

FIG. 6A is a simplified flowchart illustrating control over internal portions of an AP according to some embodiments of the present disclosure. As shown in FIG. 6A, the AP provided in the embodiments can include an intelligent control portion 6001, a BT portion 6002 and a WLAN portion 6003. The intelligent control portion 6001 is mainly configured to send a turning-on or turning-off command to the BT portion 6002 and/or the WLAN portion 6003 according to an event reported by the BT portion 6002 and/or the WLAN portion 6003. The BT portion 6002 is mainly configured to detect a terminal (i.e., STA) discovery event and, upon when a terminal is detected in an turned-on status, report to the intelligent control portion 6001 and execute a turning-on or turning-off operation according to a command sent by the intelligent control portion 6001. The WLAN portion 6003 is mainly configured to detect an event of turning itself on and an event about whether a terminal (i.e., STA) is connected with the AP or not and, when no connected terminal is detected in the on status, report to the intelligent control portion 6001 and execute the turning-on or turning-off operation according to a command sent by the intelligent control portion 6001.

FIG. 6B is a control flowchart illustrating a method for wireless control according to some embodiments of the present disclosure. As shown in FIG. 6B, the intelligent control portion of the AP, when it is determined that both the BT portion (which can also be called a BT device of the AP) of the AP and the WLAN portion (which can also be called a WLAN device of the AP) of the AP are off, can determine whether the intelligent control portion of the AP is allowed to control the BT portion of the AP or not; and if the intelligent control portion of the AP is not allowed to control the BT portion of the AP, the intelligent control portion of the AP does not execute any operation (which is an example of ending the flow), and otherwise if the intelligent control portion of the AP is allowed to control the BT portion of the AP, the intelligent control portion of the AP transmits a command of turning on the BT portion of the AP to the BT portion of the AP.

During implementation, a control shortcut key of the intelligent control portion 6001 can be set, and the shortcut key is turned on to enable an intelligent control function of the intelligent control portion 6001 for the BT portion 6002 and the WLAN portion 6003.

The intelligent control portion of the AP, when it is determined that the BT portion of the AP is off (Operation 600) and the WLAN portion of the AP is on (Operation 601), can determine whether a STA in a WLAN communication connection with the AP exists or not (Operation 603). For example, the intelligent control portion 6001 of the AP can determine by scanning whether the STA in the WLAN communication connection with the WLAN portion 6003 of the AP exists or not through the WLAN portion 6003 of the AP; and the WLAN portion 6003 of the AP, when the STA in the WLAN communication connection with the WLAN portion 6003 of the AP is detected, can report indication information used to indicate existence of the STA in the WLAN communication connection with the WLAN portion 6003 of the AP to the intelligent control portion 6001 of the AP (the existence of the STA in the WLAN communication connection with the WLAN portion 6003 cannot be reported either). The WLAN portion 6003 of the AP, when the STA in the WLAN communication connection with the WLAN portion of the AP is not detected, can report indication information used to indicate that the STA in the WLAN communication connection with the WLAN portion 6003 of the AP does not exist to the intelligent control portion 6001 of the AP. The intelligent control portion 6001 of the AP, when it is determined that the STA in the WLAN communication connection with the AP does not exist, can determine whether the intelligent control portion 6001 of the AP is allowed to control the WLAN portion 6003 of the AP or not (Operation 604); if the intelligent control portion 6001 of the AP is not allowed to control the WLAN portion 6003 of the AP, the intelligent control portion 6001 does not execute any operation, and otherwise if the intelligent control portion 6001 of the AP is allowed to control the WLAN portion 6003 of the AP, the intelligent control portion 6001 transmits a command of turning off the WLAN portion 6003 of the AP to the WLAN portion 6003 of the AP (Operation 605) and continues determining whether the intelligent control portion 6001 of the AP is allowed to control the BT portion 6002 of the AP or not (Operation 606); if the intelligent control portion 6001 of the AP is allowed to control the BT portion 6002 of the AP, the intelligent control portion 6001 transmits a command of turning on the BT portion 6002 of the AP to the BT portion 6002 of the AP, and otherwise if the intelligent control portion 6001 of the AP is not allowed to control the BT portion 6002 of the AP, the intelligent control portion 6001 does not execute any operation.

The intelligent control portion 6001 of the AP, when it is determined that the BT portion 6002 of the AP is on (Operation 600) and the WLAN portion 6003 of the AP is off (Operation 608), can determine whether a STA exists or not through the BT portion 6002 (Operation 614) and, when it is determined that the STA exists, acquire an identifier of the STA (Operation 615).

For example, the BT portion 6002 can scan the STA in an environment, the BT portion 6002 of the AP can acquire BD_ADDR (which is an example of the identifier of the STA) of a BT device from the detected STA, and then the BT portion 6002 of the AP can report BD_ADDR of the STA to the intelligent control portion 6001 of the AP. The intelligent control portion 6001 of the AP, after acquiring the identifier of the STA, can determine whether the identifier of the STA exists in a STA table entry or not (Operation 616).

For example, the intelligent control portion 6001 of the AP can traverse and query the STA table entry according to the acquired BD_ADDR; if the intelligent control portion 6001 of the AP determines that BD_ADDRE does not exist in the STA table entry, the intelligent control portion 6001 of the AP can continue receiving a STA scanned by the BT portion 6003 in the environment; and if the intelligent control portion 6001 of the AP determines that BD_ADDR exists in the STA table entry, it is indicated that the STA is allowed to establish a WLAN connection with the AP.

Next, the intelligent control portion 6001 of the AP can determine whether the intelligent control portion 6001 of the AP is allowed to control the WLAN portion 6003 of the AP or not (Operation 617); if the intelligent control portion 6001 of the AP is not allowed to control the WLAN portion 6003 of the AP, the intelligent control portion 6001 of the AP does not execute any operation; and otherwise if the intelligent control portion 6001 of the AP is allowed to control the WLAN portion 6003 of the AP, the intelligent control portion 6001 of the AP can transmit a command of turning on the WLAN portion 6003 to the WLAN portion 6003 of the AP (Operation 618), and the WLAN portion 6003 of the AP can turn on a WLAN function according to the received command of turning on WLAN.

After the WLAN function is successfully enabled, the WLAN portion 6003 of the AP can report an event that the WLAN function is successfully enabled to the intelligent control portion 6001 of the AP. The intelligent control portion 6001 of the AP, after receiving the event that the WLAN portion 6003 of the AP is successfully enabled, can determine whether the intelligent control portion 6001 of the AP is allowed to control the BT portion 6002 or not (Operation 619). If the intelligent control portion 6001 of the AP is not allowed to control the BT portion 6002, the intelligent control portion 6001 of the AP does not execute any operation; and if the intelligent control portion 6001 of the AP is allowed to control the BT portion 6002, the intelligent control portion 6001 of the AP can transmit a command of turning off the BT portion 6002 of the AP to the BT portion 6002 of the AP.

Under the circumstance that the intelligent control portion 6001 of the AP determines that the BT portion 6002 of the AP is on (Operation 600) and the WLAN portion 6003 of the AP is on (Operation 608), the intelligent control portion 6001 of the AP can determine whether the STA in the WLAN communication connection with the AP exists or not (Operation 609); and if the intelligent control portion 6001 of the AP determines that the STA in the WLAN communication connection with the AP exists, the intelligent control portion 6001 of the AP can continue determining whether the BT portion 6002 is allowed to be controlled or not (Operation 610), if the BT portion 6002 is allowed to be controlled, the intelligent control portion 6001 sends an instruction of turning off the BT portion 6002 to the BT portion 6002, otherwise, the intelligent control portion 6001 does not execute any operation.

It is to be noted that, in this flow, after the BT portion 6002 is turned off, a determination condition, namely whether the BT portion 6002 is presently in an off status or not, can be added before Operation 610 is re-executed, to avoid the instruction of turning off the BT portion 6002 from being transmitted for many times. If the intelligent control portion 6001 of the AP determines that the STA in the WLAN communication connection with the AP does not exist, the intelligent control portion 6001 of the AP can determine whether the WLAN portion 6003 is allowed to be controlled or not (Operation 612); if the WLAN portion 6003 is allowed to be controlled, the intelligent control portion 6001 sends an instruction of turning off the WLAN portion 6003 to the WLAN portion 6003, otherwise, does not execute any operation.

Under the circumstance that the intelligent control portion 6001 of the AP determines that the BT portion 6002 of the AP is off (Operation 600) and the WLAN portion 6003 of the AP is off (Operation 601), the intelligent control portion 6001 of the AP can determine whether the BT portion 6002 is allowed to be controlled (Operation 602); if the BT portion 6002 is allowed to be controlled, the intelligent control portion 6001 sends an instruction of turning on the BT portion 6002 to the BT portion 6002 (Operation 607) and continues detecting whether a STA exists or not through the BT portion 6002 (Operation 614), and otherwise if the BT portion 6002 is not allowed to be controlled, the intelligent control portion 6001 does not execute any operation.

Correspondingly, the BT portion 6002 of the AP, after receiving the command of enabling the BT function, can execute the operation of enabling the BT function of the AP. The BT portion 6002 of the AP, after receiving the command of disabling the BT function, can execute the operation of disabling the BT function of the AP.

The WLAN portion 6003 of the AP, after receiving the command of enabling the WLAN function, can execute the operation of enabling the WLAN function of the AP. The WLAN portion 6003 of the AP, after receiving the command of disabling the WLAN function, can execute the operation of disabling the WLAN function of the AP.

Figure 7:
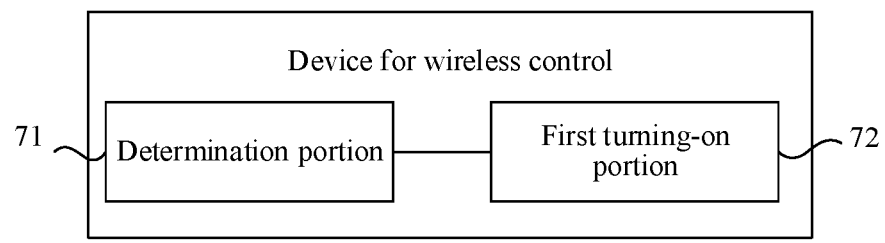
FIG. 7 is a block diagram of a device for wireless control according to some embodiments.

FIG. 7 is a block diagram of a device for wireless control according to some embodiments. As shown in FIG. 7, the device can include:

a determination portion 71, configured to perform detection through a BT portion of an AP to determine whether a terminal is detected or not; and a first turning-on portion 72, configured to, responsive to that the terminal is detected and that a WLAN portion of the AP is off, turn on the WLAN portion of the AP.

Figure 8:
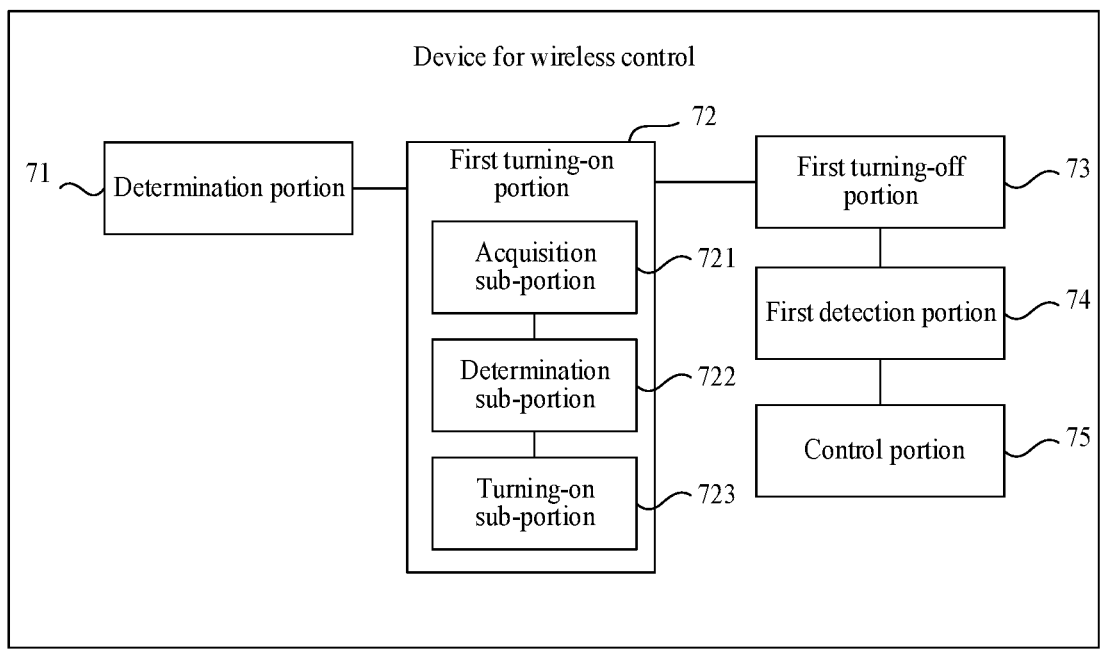
FIG. 8 is a block diagram of a device for wireless control according to some embodiments.

FIG. 8 is a block diagram of a device for wireless control according to some embodiments. For convenient description, only parts related to the embodiments are shown in FIG. 8. The components with the same reference numbers in FIG. 8 as those in FIG. 7 have the same functions. For simplicity, detailed descriptions about these components are omitted.

As shown in FIG. 8, in a possible implementation mode, the first turning-on portion 72 includes:

an acquisition sub-portion 721, configured to, responsive to that the terminal is detected and that the WLAN portion of the AP is off, acquire an identifier of the terminal;

a determination sub-portion 722, configured to determine whether the terminal is allowed to establish a WLAN communication connection with the AP or not according to the identifier; and a turning-on sub-portion 723, configured to, responsive to that the terminal is allowed to establish the WLAN communication connection with the AP, turn on the WLAN portion of the AP.

In a possible implementation mode, the device can further include:

a first turning-off portion 73, configured to, responsive to that the WLAN portion of the AP is turned on, turn off the BT portion of the AP.

In a possible implementation mode, the device can further include:

a first detection portion 74, configured to detect a terminal connected with the AP through the WLAN portion of the AP; and a control portion 75, configured to, responsive to there is no terminal in a WLAN communication connection with the AP, turn off the WLAN portion of the AP and turn on the BT portion of the AP.

Figure 9:
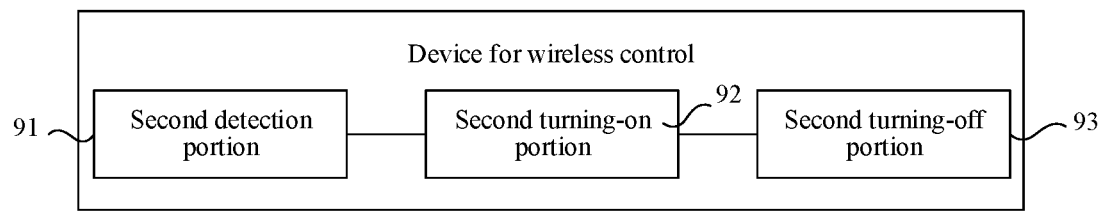
FIG. 9 is a block diagram of a device for wireless control according to some embodiments.

FIG. 9 is a block diagram of a device for wireless control according to some embodiments. As shown in FIG. 9, the device can include:

a second detection portion 91, configured to detect a terminal connected with an AP through a WLAN portion of the AP;

a second turning-on portion 92, configured to, responsive to that there is no terminal in a WLAN communication connection with the AP and that a BT portion of the AP is off, turn on the BT portion of the AP; and a second turning-off portion 93, configured to, responsive to that the BT portion of the AP is turned on, turn off the WLAN portion of the AP.

Figure 10:
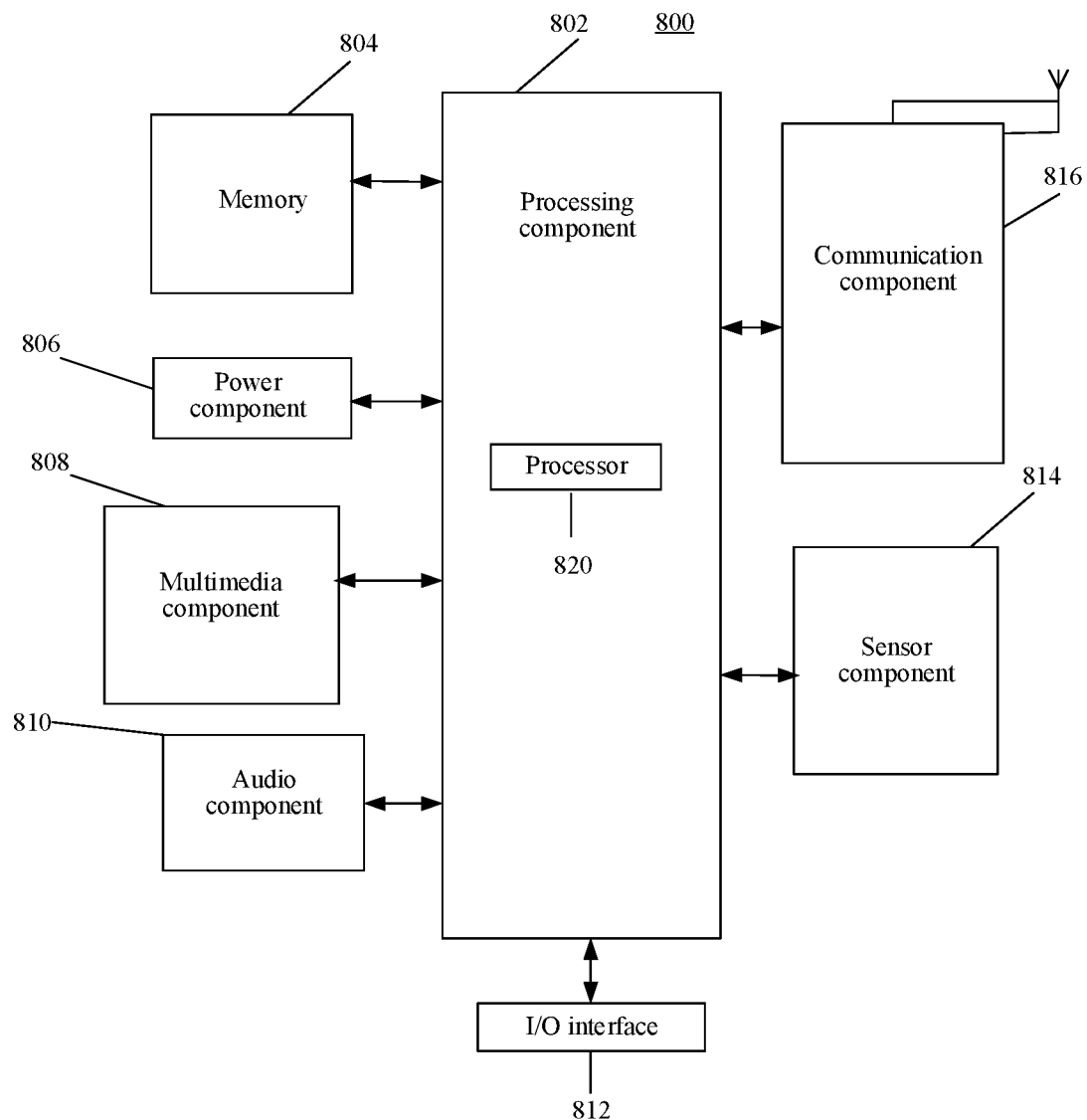
FIG. 10 is a block diagram of a device for wireless control according to some embodiments.

FIG. 10 is a block diagram of a device for wireless control according to some embodiments. For example, the device 800 can be a mobile phone, a computer, a digital broadcast terminal, a messaging device, a gaming console, a tablet, a medical device, exercise equipment, a personal digital assistant and the like.

Referring to FIG. 10, the device 800 can include one or more of the following components: a processing component 802, a memory 804, a power component 806, a multimedia component 808, an audio component 810, an Input/Output (I/O) interface 812, a sensor component 814, and a communication component 816.

The processing component 802 is typically configured to control overall operations of the device 800, such as the operations connected with display, telephone calls, data communications, camera operations, and recording operations. The processing component 802 can include one or more processors 820 to execute instructions to perform all or part of the operations in the above-mentioned method. Moreover, the processing component 802 can include one or more portions which facilitate interaction between the processing component 802 and other components. For instance, the processing component 802 can include a multimedia portion to facilitate interaction between the multimedia component 808 and the processing component 802.

The various device components, units, blocks, or portions may have modular configurations, or are composed of discrete components, but nonetheless can be referred to as "modules" in general. In other words, the "components," "modules," "blocks," "portions," or "units" referred to herein may or may not be in modular forms.

The memory 804 is configured to store various types of data to support the operation of the device 800. Examples of such data include instructions for any application programs or methods operated on the device 800, contact data, phonebook data, messages, pictures, video, etc. The memory 804 can be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 is configured to provide power for various components of the device 800. The power component 806 can include a power management system, one or more power supplies, and other components connected with generation, management and distribution of power for the device 800.

The multimedia component 808 can include a screen for providing an output interface between the device 800 and a user. In some examples, the screen can include a Liquid Crystal Display (LCD) and a Touch Panel (TP). In some embodiments, organic light-emitting diode (OLED) or other types of displays can be employed. If the screen includes the TP, the screen can be implemented as a touch screen to receive an input signal from the user. The TP includes one or more touch sensors to sense touches, swipes and gestures on the TP. The touch sensors can not only sense a boundary of a touch or swipe action but also detect a duration and pressure connected with the touch or swipe action. In some examples, the multimedia component 808 includes a front camera and/or a rear camera. The front camera and/or the rear camera can receive external multimedia data when the device 800 is in an operation mode, such as a photographing mode or a video mode. Each of the front camera and the rear camera can be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the device 800 is in the operation mode, such as a call mode, a recording mode and a voice recognition mode. The received audio signal can further be stored in the memory 804 or sent through the communication component 816. In some examples, the audio component 810 further includes a speaker configured to output the audio signal.

The I/O interface 812 is configured to provide an interface between the processing component 802 and a peripheral interface portion, and the peripheral interface portion can be a keyboard, a click wheel, a button and the like. The button can include, but not limited to: a home button, a volume button, a starting button and a locking button.

The sensor component 814 can include one or more sensors configured to provide status assessment in various aspects for the device 800. For instance, the sensor component 814 can detect an on/off status of the device 800 and relative positioning of components, such as a display and small keyboard of the device 800, and the sensor component 814 can further detect a change in a position of the device 800 or a component of the device 800, presence or absence of contact between the user and the device 800, orientation or acceleration/deceleration of the device 800 and a change in temperature of the device 800. The sensor component 814 can include a proximity sensor configured to detect presence of an object nearby without any physical contact. The sensor component 814 can also include a light sensor, such as a Complementary Metal Oxide Semiconductor (CMOS) or Charge Coupled Device (CCD) image sensor, configured for use in an imaging APP. In some examples, the sensor component 814 can also include an acceleration sensor, a gyroscope sensor, a magnetic sensor, a pressure sensor or a temperature sensor.

The communication component 816 is configured to facilitate wired or wireless communication between the device 800 and other equipment. The device 800 can access a communication-standard-based wireless network, such as a Wireless Fidelity (Wi-Fi) network, a 2nd-Generation (2G), 3rd-Generation (3G), 4th-Generation (4G), or 5th-Generation (5G) network or a combination thereof. In some embodiments, the communication component 816 receives a broadcast signal or broadcast connected information from an external broadcast management system through a broadcast channel. In some embodiments, the communication component 816 can further include a Near Field Communication (NFC) portion to facilitate short-range communication. For example, the NFC portion can be implemented based on a Radio Frequency Identification (RFID) technology, an Infrared Data Association (IrDA) technology, an Ultra-WideBand (UWB) technology, a BT technology and another technology.

In some embodiments, the device 800 can be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments, there is also provided a non-transitory computer-readable storage medium having stored an instruction thereon, such as the memory 804 including an instruction, and the instruction can be executed by the processor 820 of the device 800 to implement the abovementioned method. For example, the non-transitory computer-readable storage medium can be a ROM, a Compact Disc Read-Only Memory (CD-ROM), a magnetic tape, a floppy disc, an optical data storage device and the like.

A non-transitory computer-readable storage medium can have instructions stored thereon, which executable by a processor of a terminal to enable the terminal to execute the methods of the embodiments described above.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for wireless control, applied to an Access Point (AP) and comprising:
    performing detection through a Bluetooth (BT) portion of the AP to determine whether a terminal is detected or not; and
    responsive to that the terminal is detected and that a Wireless Local Area Network (WLAN) portion of the AP is off, turning on the WLAN portion of the AP,
        wherein said turning on the WLAN portion of the AP responsive to that the terminal is detected and that the WLAN portion of the AP is off comprises:
    responsive to that the terminal is detected and that the WLAN portion of the AP is off, acquiring an identifier of the terminal;
    determining whether the terminal is allowed to establish a WLAN communication connection with the AP or not according to the identifier; and
    responsive to that the terminal is allowed to establish the WLAN communication connection with the AP, turning on the WLAN portion of the AP,
        wherein the BT module and the WLAN module are intelligently controlled to be turned on or turned off by an intelligent control module of the AP.

2. The method of claim 1, further comprising:
    responsive to that the WLAN portion of the AP is turned on, turning off the BT portion of the AP.

3. The method of claim 2, further comprising:
    detecting whether there is a terminal connected with the AP through the WLAN portion of the AP; and
    responsive to that there is no terminal in a WLAN communication connection with the AP, turning off the WLAN portion of the AP and turning on the BT portion of the AP.

4. The method of claim 1, further comprising:
    detecting whether there is a terminal connected with the AP through the WLAN portion of the AP; and
    responsive to that there is no terminal in a WLAN communication connection with the AP and that the BT portion of the AP is off, turning on the BT portion of the AP.

5. The method of claim 4, further comprising:
    responsive to that the BT portion of the AP is turned on, turning off the WLAN portion of the AP.

6. A non-transitory computer-readable storage medium having instructions stored thereon, for execution by a processor of a terminal, to enable the terminal to implement operations of the method of claim 1.

7. The non-transitory computer-readable storage medium of claim 6, wherein the instructions are for further execution by the processor to enable the terminal to implement operations of:
    responsive to that the WLAN portion of the AP is turned on, turning off the BT portion of the AP.

8. The non-transitory computer-readable storage medium of claim 7, wherein the instructions are for further execution by the processor to enable the terminal to implement operations of:
    detecting whether there is a terminal connected with the AP through the WLAN portion of the AP; and
    responsive to that there is no terminal in a WLAN communication connection with the AP, turning off the WLAN portion of the AP and turning on the BT portion of the AP.

9. The non-transitory computer-readable storage medium of claim 6, wherein the instructions are for further execution by the processor to enable the terminal to implement operations of:
    detecting whether there is a terminal connected with the AP through the WLAN portion of the AP; and
    responsive to that there is no terminal in a WLAN communication connection with the AP and that the BT portion of the AP is off, turning on the BT portion of the AP.

10. The non-transitory computer-readable storage medium of claim 9, wherein the instructions are for further execution by the processor to enable the terminal to implement operations of:
    responsive to that the BT portion of the AP is turned on, turning off the WLAN portion of the AP.

11. An apparatus having the AP implementing the method according to claim 1, wherein the apparatus is configured to have a WLAN portion of the AP dynamically and automatically turned on without user intervention.

12. The apparatus of claim 11, wherein the apparatus is further configured to turn off the WLAN and turn on the BT upon detecting no terminal being in communication with the WLAN to thereby dynamically reduce power consumption of the AP.

13. A device for wireless control, comprising:
a processor; and
a memory configured to store an instruction executable by the processor,
wherein the processor is configured to:
perform detection through a Bluetooth (BT) portion of the AP to determine whether a terminal is detected or not; and
responsive to that the terminal is detected and that a Wireless Local Area Network (WLAN) portion of the AP is off, turn on the WLAN portion of the AP,
wherein the processor is further configured to:
responsive to that the terminal is detected and that the WLAN portion of the AP is off, acquire an identifier of the terminal;
determine whether the terminal is allowed to establish a WLAN communication connection with the AP or not according to the identifier; and
responsive to that the terminal is allowed to establish the WLAN communication connection with the AP, turn on the WLAN portion of the AP,
wherein the AP further comprises a controller configured to intelligently control the BT portion and the WLAN portion.

14. The device of claim 13, wherein the processor is further configured to:
responsive to that the WLAN portion of the AP is turned on, turn off the BT portion of the AP.

15. The device of claim 14, wherein the processor is further configured to:
detect whether there is a terminal connected with the AP through the WLAN portion of the AP; and
responsive to that there is no terminal in a WLAN communication connection with the AP, turn off the WLAN portion of the AP and turn on the BT portion of the AP.

16. The device of claim 14, wherein the processor is further configured to:
detect whether there is a terminal connected with the AP through the WLAN portion of the AP; and
responsive to that there is no terminal in a WLAN communication connection with the AP and that the portion of the AP is off, turn on the BT portion of the AP.

17. The device of claim 16, wherein the processor is further configured to:
responsive to that the BT portion of the AP is turned on, turn off the WLAN portion of the AP.

* * * * *